US012776222B2

(12) United States Patent
Omari et al.

(10) Patent No.: US 12,776,222 B2
(45) Date of Patent: Oct. 27, 2026

(54) ADAPTIVE OBJECT DETECTION

(71) Applicant: Skydio, Inc., San Mateo, CA (US)

(72) Inventors: Sammy Omari, Zurich (CH); Pascal Gohl, Winterthur (CH); Andreas Jäger, Zurich (CH); Joseph A. Enke, Campbell, CA (US); Simon Doessegger, Zurich (CH); Tim Oberhauser, Basel (CH)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/184,789

(22) Filed: Apr. 21, 2025

(65) Prior Publication Data

US 2025/0252860 A1 Aug. 7, 2025

Related U.S. Application Data

(63) Continuation of application No. 18/601,096, filed on Mar. 11, 2024, now abandoned, which is a
(Continued)

(51) Int. Cl.
*G06T 7/00* (2017.01)
*G05D 1/00* (2006.01)
(Continued)

(52) U.S. Cl.
CPC ............ *G08G 5/80* (2025.01); *G05D 1/0202* (2013.01); *G05D 1/46* (2024.01); *G06T 7/579* (2017.01);
(Continued)

(58) Field of Classification Search
CPC ... G08G 5/80; G08G 5/57; G08G 5/55; G06T 7/579; G06T 2207/10032; G06V 20/17; G06V 20/13; G05D 1/46; G05D 1/0202
(Continued)

(56) References Cited

U.S. PATENT DOCUMENTS 10,564,638 B1 2/2020 Lockwood et al.
11,423,791 B2 8/2022 Omari et al.
(Continued)

FOREIGN PATENT DOCUMENTS

EP 1157355 B1 4/2007

OTHER PUBLICATIONS

Koichiro Yamaguchi, Robust Monocular Epipolar Flow Estimation, 2013, IEEE Conference on Computer Vision and Pattern Recognition, Entire Document (p. 1862-1869).
(Continued)

*Primary Examiner* — Tiffany P Young
(74) *Attorney, Agent, or Firm* — Young Basile Hanlon & MacFarlane, P.C.

(57) ABSTRACT

Controlling an unmanned aerial vehicle to traverse a portion of an operational environment of the unmanned aerial vehicle may include obtaining an object detection type, obtaining object detection input data, obtaining relative object orientation data based on the object detection type and the object detection input data, and performing an object avoidance operation based on the relative object orientation data. The object detection type may be monocular object detection, which may include obtaining the relative object orientation data by obtaining motion data indicating a change of spatial location for the unmanned aerial vehicle between obtaining the first image and obtaining the second image based on searching along epipolar lines to obtain optical flow data.

20 Claims, 8 Drawing Sheets

Related U.S. Application Data continuation of application No. 17/880,970, filed on Aug. 4, 2022, now Pat. No. 12,039,877, which is a continuation of application No. 15/906,720, filed on Feb. 27, 2018, now Pat. No. 11,423,791.

(60) Provisional application No. 62/614,167, filed on Jan. 5, 2018.

(51) Int. Cl.

| | |
|---|---|
| ***G05D 1/46*** | (2024.01) |
| ***G06T 7/579*** | (2017.01) |
| ***G06V 20/13*** | (2022.01) |
| ***G06V 20/17*** | (2022.01) |
| ***G08G 5/00*** | (2025.01) |
| ***G08G 5/55*** | (2025.01) |
| ***G08G 5/57*** | (2025.01) |
| ***G08G 5/80*** | (2025.01) |

(52) U.S. Cl.

CPC .............. *G06V 20/13* (2022.01); *G06V 20/17* (2022.01); *G08G 5/55* (2025.01); *G08G 5/57* (2025.01); *G06T 2207/10032* (2013.01)

(58) Field of Classification Search

USPC .............................................................. 701/3

See application file for complete search history.

(56) References Cited

U.S. PATENT DOCUMENTS

| | | | |
|---|---|---|---|
| 2015/0260526 | A1 | 9/2015 | Paduano et al. |
| 2017/0045895 | A1 | 2/2017 | Wang et al. |
| 2017/0229025 | A1 | 8/2017 | Klinger et al. |
| 2018/0278844 | A1 | 9/2018 | Tian et al. |
| 2019/0004543 | A1 | 1/2019 | Kennedy et al. |
| 2019/0051193 | A1 | 2/2019 | Gutierrez et al. |
| 2019/0213895 | A1 | 7/2019 | Omari et al. |
| 2022/0392359 | A1 | 12/2022 | Omari et al. |

OTHER PUBLICATIONS

International Search Report and Written Opinion for Appl. No. PCT/US2018/066416, dated Apr. 4, 2019, 9 pages.

Zhahir et al., "Current development of UAV sense and avoid system", IOP Conf. Series: Materials Science and Engineering, 2016, 152, 012035 doi:10.1088/1757-899X/152/1/012035, 18 pages.

International Preliminary Report on Patentability and Written Opinion for App. No. PCT/US2018/066416, dated Jul. 16, 2020, 7 pages.

ADAPTIVE OBJECT DETECTION

CROSS REFERENCE TO RELATED APPLICATIONS

This application is a continuation of U.S. patent application Ser. No. 18/601,096, filed on Mar. 11, 2024, which is a continuation of U.S. patent application Ser. No. 17/880,970, filed on Aug. 4, 2022, now U.S. Pat. No. 12,039,877, which is a continuation of U.S. patent application Ser. No. 15/906,720, dated Feb. 27, 2018, now U.S. Pat. No. 11,423,791, which claims the benefit of U.S. Provisional Application No. 62/614,167, filed Jan. 5, 2018, the contents of which are incorporated by reference herein in their entireties.

TECHNICAL FIELD

This disclosure relates to unmanned aerial vehicles (UAVs).

BACKGROUND

An unmanned aerial vehicle may operate in an environment that includes obstacles, such as external objects. Accordingly, including functionality for detecting objects, such as to determine a position of the unmanned aerial vehicle relative to the object, a distance between the unmanned aerial vehicle and the object, or the like, in an unmanned aerial vehicle would be advantageous.

SUMMARY

Systems and techniques for adaptive object detection are described herein.

The present teachings provide: a system, include: an unmanned aerial vehicle and an external user interface device. The unmanned aerial vehicle includes: image capture devices comprising a field of view, wherein the image capture devices are configured to capture an object. The external user interface device includes: a computing device. The computing device includes a processor and a trajectory controller. The processor is configured to execute instruction stored on a non-transitory computer readable medium to determine a location data of the object by: obtaining a first temporal location of the object; obtaining a second temporal location of the object; and obtaining a location of the unmanned aerial vehicle by comparing the first temporal location of the object to the second temporal location of the object. The trajectory controller is configured to indicate a spatial trajectory of the unmanned aerial vehicle based upon the first temporal location and the second temporal location relative to the unmanned aerial vehicle.

The present teachings provide a method comprising: capturing images and controlling a spatial trajectory of an unmanned aerial vehicle. The method includes capturing images of an object with an image capture device comprising a field of view. The method includes determining location data of the object relative to an unmanned aerial vehicle comprising the image capture device, by a processor in response to instructions stored on a non-transitory computer readable medium. The method includes obtaining a first temporal location of the object. The method includes obtaining a second temporal location of the object. The method includes obtaining a location of the unmanned aerial vehicle by comparing the first temporal location and the second temporal location of the object. The method includes controlling a spatial trajectory of the unmanned aerial vehicle, with a trajectory controller, based on the first temporal location and the second temporal location relative to the unmanned aerial vehicle.

The present teachings provide: a non-transitory computer-readable storage medium, including processor-executable instructions for controlling, by a processor in response to the instructions, a spatial trajectory of an unmanned aerial vehicle. The processor captures images of an object with an image capturing device comprising a field of view. The processor obtains a first temporal location of the object. The processor obtains a second temporal location of the object. The processor obtains a location of the unmanned aerial vehicle by comparing the first temporal location and the second temporal location of the object. The processor controls the spatial trajectory of the unmanned aerial vehicle with, a trajectory controller, based on the first temporal location and the second temporal location relative to the unmanned aerial vehicle.

One aspect of the disclosure is an unmanned aerial vehicle including a processor configured to execute instruction stored on a non-transitory computer readable medium to control the unmanned aerial vehicle to traverse a portion of an operational environment of the unmanned aerial vehicle by obtaining an object detection type, obtaining object detection input data, and obtaining relative object orientation data based on the object detection type and the object detection input data. The unmanned aerial vehicle includes a trajectory controller configured to perform a collision avoidance operation in response to the relative object orientation data.

Another aspect of the disclosure is a method for controlling, by a processor in response to instructions stored on a non-transitory computer readable medium, an unmanned aerial vehicle to traverse a portion of an operational environment of the unmanned aerial vehicle. The method includes obtaining an object detection type, obtaining object detection input data, obtaining relative object orientation data based on the object detection type and the object detection input data, and performing a collision avoidance operation based on the relative object orientation data.

Another aspect of the disclosure is a non-transitory computer-readable storage medium, comprising processor-executable instructions for controlling, by a processor in response the instructions, an unmanned aerial vehicle to traverse a portion of an operational environment of the unmanned aerial vehicle by obtaining an object detection type, obtaining object detection input data, obtaining relative object orientation data based on the object detection type and the object detection input data, and performing a collision avoidance operation based on the relative object orientation data.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Unmanned mobile apparatus, such as an unmanned aerial vehicle, may operate in an environment that includes objects that may obstruct or interfere with the operation of the apparatus. Operational modes, including operator controlled modes, autonomous modes, and semi-autonomous modes, may use sensors of the apparatus to detect, track, and avoid obstacles. An unmanned mobile apparatus may use one or more types of object detection and tracking, such as optical object detection, radar object detection, ultrasound object detection, or the like. The efficiency and accuracy of each object detection type may correspond with operational environment conditions. For example, the efficiency, accuracy, or both, of optical object detection may be optimal within a defined range of illumination conditions. In another example, the efficiency, accuracy, or both, of binocular object detection may optimal at operational velocities below a defined threshold.

An unmanned mobile apparatus may implement adaptive object detection, which may include evaluating available candidate object detection types based on operational conditions and corresponding evaluation metrics to identify an optimal object detection type, and may use the identified object detection type to detect, track, and avoid obstacles. Implementing adaptive object detection may include using monocular object detection, which may include temporal object detection based on temporally sequential images captured by an image capture device. Motion information for the unmanned mobile apparatus may be correlated to the captured images to identify an epipole, or point of convergence, and an image may be searched along epipolar lines extending from the point of convergence for content representing objects identified in a previous image to identify optical flow data corresponding to the objects between the images. Three-dimensional object location data, including depth data, may be triangulated based on the optical flow data, and may be used by the unmanned mobile apparatus to track and avoid the objects.

Figure 1:
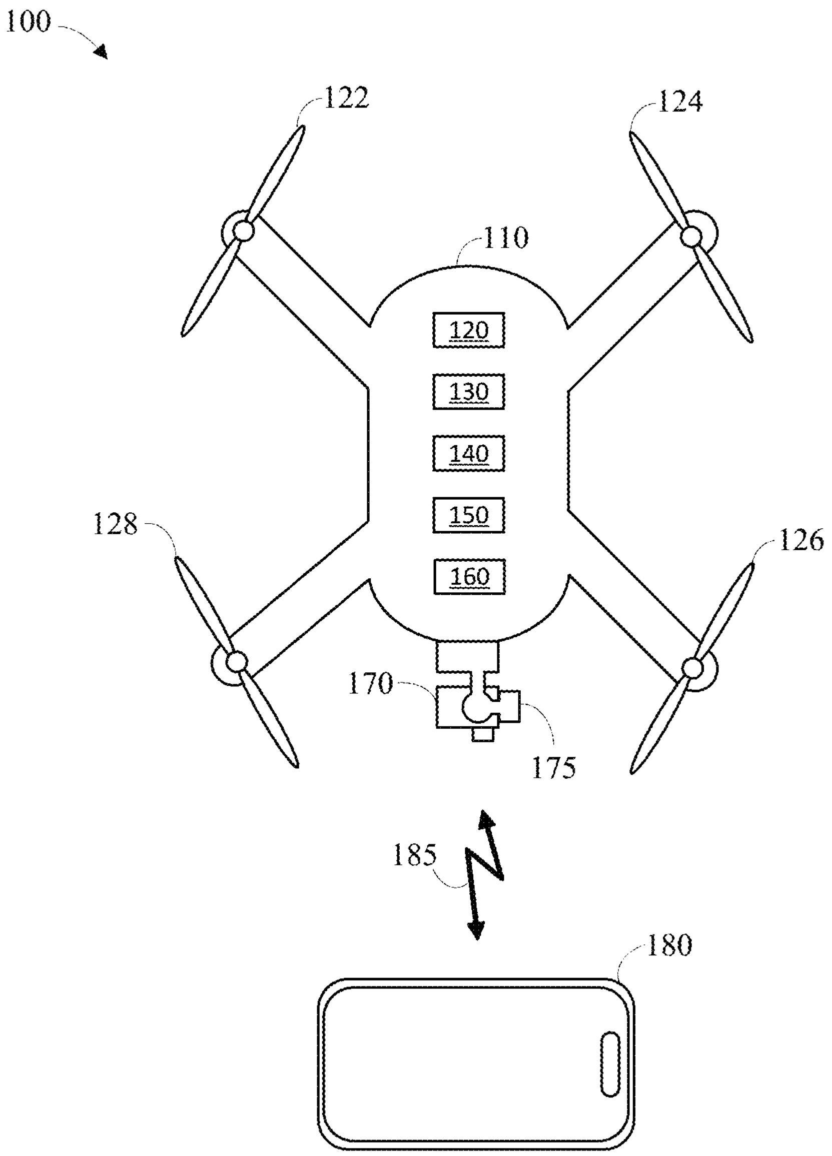
FIG. 1 shows an example of an unmanned aerial vehicle in accordance with this disclosure

FIG. 1 shows an example of an unmanned aerial vehicle 100 in accordance with this disclosure. For simplicity and clarity, the unmanned aerial vehicle 100 is shown in FIG. 1 in a quad-copter configuration. As shown, the unmanned aerial vehicle 100 includes a body 110, a propulsion unit 120, a motor 130, a power supply unit 140, a control unit 150, a communications unit 160, and a sensor 170. Although not shown in FIG. 1, the unmanned aerial vehicle 100 may include any other component or combination of components of an unmanned aerial vehicle. The orientation or position of the motor 130, the power supply unit 140, the control unit 150, the communications unit 160, and the sensor 170 are shown for simplicity and clarity, any other orientation may be used.

The body 110 may be a structure, a chassis, a platform, a housing, or an enclosure. For example, a movable quad-copter drone platform is shown in FIG. 1. The propulsion unit 120, the motor 130, the power supply unit 140, the control unit 150, the communications unit 160, the sensor 170, or any other component of the unmanned aerial vehicle 100 may be coupled to, such as mounted, movably attached, fixed, or otherwise incorporated or physically connected to the body 110.

The propulsion unit 120 may include, or may be operatively coupled with, four rotors 122, 124, 126, 128 in the quad-copter configuration shown. Other propulsion units, such as propulsion units including a different number or configuration of rotors, may be used.

Components of the unmanned aerial vehicle 100, such as the propulsion unit 120, the motor 130, the power supply unit 140, the control unit 150, the communications unit 160, and the sensor 170 may be operatively interconnected. For example, the power supply unit 140 may be operatively connected to the propulsion unit 120, the motor 130, the control unit 150, the communications unit 160, the sensor 170, or a combination thereof, to supply power to the respective components. In another example, the control unit 150 may be operatively connected to the propulsion unit 120, the motor 130, the power supply unit 140, the communications unit 160, the sensor 170, or a combination thereof, to control the operation of the respective components.

The motor 130 may be, for example, an electric motor which may be operatively coupled to, and may receive power from, the power supply unit 140. Although one motor 130 is shown in FIG. 1, each rotor 122, 124, 126, 128 of the propulsion unit 120 may be driven by a respective electric motor.

The power supply unit 140 may be, for example, a battery pack mounted on or in the body 110 of the unmanned aerial vehicle 100, and may supply electrical power to the propulsion unit 120, the motor 130, the communications unit 160, the sensor 170, or any other component or combination of components of the unmanned aerial vehicle 100.

The sensor 170 may obtain, capture, or generate sensor data. For example, the sensor 170 may be an image capture apparatus, which may include an image capture device, such as a camera, which may obtain, capture, or generate, image content, such as images, video, or both.

Although not expressly shown in FIG. 1, an image capture device may include a lens or another optical element, for receiving and focusing light, and an image sensor for converting the received and focused light to an image signal, such as by measuring or sampling the light. The sensor 170 may have a field-of-view. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

Although not expressly shown in FIG. 1, an image capture device may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, the sensor 170 may include one or more microphones, which may receive, capture, and record audio information. For example, the sensor 170 may include an image sensor and an audio sensor and audio information captured by the audio sensor may be associated with images acquired by the image sensor.

Although not expressly shown in FIG. 1, the sensor 170 may include one or more other information sources or sensors, such as an inertial measurement unit (EIU), a global positioning system (GPS) receiver component, a pressure sensor, a temperature sensor, or any other unit, or combination of units, that may be included in the unmanned aerial vehicle 100.

The unmanned aerial vehicle 100 may interface with or communicate with an external device, such as the external user interface (UI) device 180, via a wired (not shown) or wireless (as shown) computing communication link 185. Although a single computing communication link 185 is shown in FIG. 1 for simplicity, any number of computing communication links may be used. Although the computing communication link 185 shown in FIG. 1 is shown as a direct computing communication link, an indirect computing communication link, such as a link including another device or a network, such as the internet, may be used.

In some implementations, the computing communication link 185 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 185 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

The user interface device 180 may be a computing device, such as a smartphone, a tablet computer, a phablet, a smart watch, a portable computer, and/or another device or combination of devices configured to receive user input, communicate information with the unmanned aerial vehicle 100 via the computing communication link 185, or receive user input and communicate information with the unmanned aerial vehicle 100 via the computing communication link 185.

The unmanned aerial vehicle 100 may transmit images, such as panoramic images, or portions thereof, to the user interface device 180 via the computing communication link 185, and the user interface device 180 may store, process, display, or a combination thereof the images. The user interface device 180 may display, or otherwise present, content, such as images or video, acquired by the unmanned aerial vehicle 100. The user interface device 180 may communicate information, such as metadata or control information, to the unmanned aerial vehicle 100. In some implementations, the unmanned aerial vehicle 100 may communicate with one or more other external devices (not shown) via wired or wireless computing communication links (not shown).

The sensor 170, or a portion thereof, may be coupled to the body 110 of the unmanned aerial vehicle 100 via a controllable sensor orientation unit 175. For example, the sensor orientation unit 175 may removably mount the sensor 170, or a portion thereof, to the unmanned aerial vehicle 100. The sensor orientation unit 175 may be, for example, a three-axis gimbal for controlling, such as rotating, the orientation of the sensor 170, or a portion thereof, about three independent axes. The sensor orientation unit 175 may include any type of translational elements, rotational elements, or both, that permit rotational movement, translational movement, or both, in one, two, or three dimensions of the sensor 170 with respect to the unmanned aerial vehicle 100.

The user interface device 180 may include a communications interface (not expressly shown) via which the user interface device 180 may receive and send messages, such as commands, related to operation of the unmanned aerial vehicle 100, the sensor 170, the sensor orientation unit 175, or a combination thereof. The commands can include movement commands, configuration commands, operational control commands, imaging commands, or a combination thereof.

For example, flight direction, attitude, altitude, or a combination thereof, of the unmanned aerial vehicle 100 may be controlled by the user interface device 180, such as by controlling respective speeds of the motors 130 that drive the respective rotors 122, 124, 126, 128 of the propulsion unit 120 of the unmanned aerial vehicle 100. In an example, the sensor 170 may include a GPS receiver, which may provide navigational data to the user interface device 180, which may be used in determining flight paths and displaying current location through the user interface device 180. A vision-based navigation system may be implemented that tracks visually significant features through image data captured by the sensor 170 to provide navigation data, such as the speed and position of the unmanned aerial vehicle 100, to the user interface device 180.

The user interface device 180 may implement a software application, such as GoPro Studio®, GoPro App®, or the like, configured to perform operations related to configuration of orientation or positioning of the sensor 170 via the sensor orientation unit 175, and control of video acquisition, and/or display of video captured by the sensor 170 through the user interface device 180. An application, such as the GoPro App®, may enable a user to create short video clips and share video clips to a cloud service (e.g., Instagram®, Facebook®, YouTube®, Dropbox®); perform full remote control of functions of the sensor 170; live preview video being captured for shot framing; mark key moments while recording (e.g., HiLight Tag®, View HiLight Tags in GoPro Camera Roll®) for location and/or playback of video highlights; wirelessly control camera software; and/or perform other functions.

Although the unmanned aerial vehicle 100 is shown in FIG. 1 in a quad-copter configuration for simplicity and clarity, any unmanned aerial vehicle configuration may be used. In some implementations, one or more of the units of the unmanned aerial vehicle 100 shown in FIG. 1 may be combined or omitted. For example, the communications unit 160, sensor 170, the sensor orientation unit 175, or a combination thereof, may be omitted.

Figure 2:
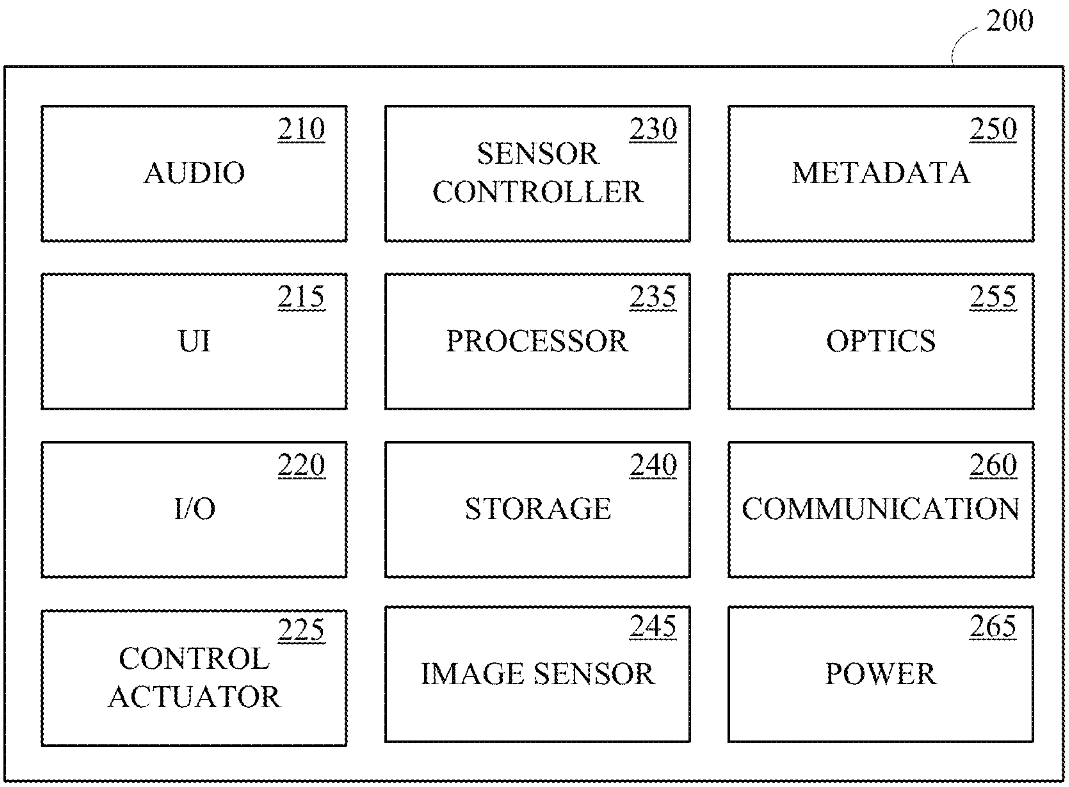
FIG. 2 is a block diagram of an example of a computing device in accordance with implementations of this disclosure

FIG. 2 is a block diagram of an example of a computing device 200 in accordance with implementations of this disclosure. As shown, the computing device 200 includes an audio component 210, a user interface (UI) unit 215, an input/output (I/O) unit 220, a control actuator unit 225, a sensor controller 230, a processor 235, an electronic storage unit 240, an image sensor 245, a metadata unit 250, an optics unit 255, a communication unit 260, and a power supply 265.

For example, an unmanned aerial vehicle, such as the unmanned aerial vehicle 100 shown in FIG. 1, may include the computing device 200. In another example, a user interface device, such as the user interface device 180 shown in FIG. 1, may include the computing device 200. Some elements of the unmanned aerial vehicle 100 or the user interface device 180 shown in FIG. 1 may correspond with respective elements of the computing device 200 shown in FIG. 2.

The audio component 210, which may include a microphone, may receive, sample, capture, record, or a combination thereof audio information, such as sound waves. Audio information captured by the audio component 210 may be associated with, such as stored in association with, image or video content, such as image or video content contemporaneously captured by the computing device 200.

The audio information captured by the audio component 210 may be encoded. For example, the audio information captured by the audio component 210 may be encoded using a codec, such as Advanced Audio Coding (AAC), Audio Compression-3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats or codecs.

In some implementations, such as implementations implementing spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

The user interface unit 215 may include a user input interface unit. The user input interface unit may include one or more units that may register or receive input from a user, such as a touch interface, a proximity sensitive interface, a light receiving unit, a sound receiving unit, or a combination thereof.

The user interface unit 215 may include a user interface presentation unit. The user interface presentation unit may present, such as display, a user interface, or a portion thereof, or other user presentable output.

Aspects of the user input interface unit and the user interface presentation unit may be combined. For example, the user interface unit 215 may include a light receiving and emitting unit, a sound receiving and emitting unit, or the like. In some implementations, the user interface unit 215 may include a display, one or more tactile elements, such as buttons, which may be virtual touch screen buttons, lights (LEDs), speakers, or other user interface elements or combinations of elements. The user interface unit 215 may receive user input from a user related to the operation of the computing device 200. The user interface unit 215 may provide information to a user related to the operation of the computing device 200.

The user interface unit 215 may include a display unit for presenting information, such as information related to camera control or unmanned aerial vehicle control, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 215 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

The I/O unit 220 may synchronize the computing device 200 with other devices, such as other external devices. For example, the computing device 200 may be implemented in an unmanned aerial vehicle, such as the unmanned aerial vehicle 100 shown in FIG. 1, and I/O unit 220 may synchronize the computing device 200 in the unmanned aerial vehicle with another computing device implemented in a user interface device, such as the user interface device 180 shown in FIG. 1.

The I/O unit 220 may communicate information between I/O components. In some implementations, the I/O unit 220 may be connected to the communication unit 260 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 180 shown in FIG. 1, or another metadata source. In some implementations, the I/O unit 220 may interface with LED lights, a display, a button, a microphone, speakers, and/or other I/O components. In some implementations, the I/O unit 220 may interface with the power supply 265.

The I/O unit 220 of the computing device 200 may include one or more connections to external computerized devices for configuration and/or management of remote devices, as described herein. The I/O unit 220 may include any of the wireless or wireline interfaces described herein, and/or may include customized or proprietary connections for specific applications.

The control actuator unit 225 may be a dedicated processing unit for controlling or actuating a device or unit associated with, such as coupled to or incorporated with, the computing device 200. For example, the computing device 200 may be included in an apparatus, such as the unmanned aerial vehicle 100 shown in FIG. 1, and the control actuator unit 225 may control the actuation of a unit of the apparatus, such as the controllable sensor orientation unit 175. Although shown separately from the processor 235 in FIG. 2, the processor 235 may include the control actuator unit 225.

The sensor controller 230 may operate or control the image sensor 245, such as in response to input, such as user input. For example, the sensor controller 230 may receive image and/or video input from the image sensor 245 and may receive audio information from the audio component 210.

The processor 235 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the computing device 200. The processor 235 may interface with the sensor controller 230 to obtain and process sensory information, such as for object detection, face tracking, stereo vision, and/or other image processing.

The sensor controller 230, the processor 235, or both may synchronize information received by the computing device 200. For example, timing information may be associated with received sensor data, and metadata information may be related to content, such as images or videos, captured by the image sensor 245 based on the timing information. In some implementations, the metadata capture may be decoupled from video/image capture. For example, metadata may be stored before, after, and in-between the capture, processing, or storage of one or more video clips and/or images.

The sensor controller 230, the processor 235, or both may evaluate or process received metadata and may generate other metadata information. For example, the sensor controller 230 may integrate the received acceleration information to determine a velocity profile for the computing device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 215, the I/O unit 220, the sensor controller 230, the processor 235, the electronic storage unit 240, the image sensor 245, the metadata unit 250, the optics unit 255, the communication unit 260, or the power supply 265 of the computing device 200 may communicate information, power, or both with one or more other units, such as via an electronic communication pathway, such as a system bus. For example, the processor 235 may interface with the audio component 210, the user interface unit 215, the I/O unit 220, the sensor controller 230, the electronic storage unit 240, the image sensor 245, the metadata unit 250, the optics unit 255, the communication unit 260, or the power supply 265 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 235 in accordance with a defined schedule, such as values of latitude, longitude, and elevation at 10 Hz.

The electronic storage unit 240 may include a system memory module that may store executable computer instructions that, when executed by the processor 235, perform various functionalities including those described herein. For example, the electronic storage unit 240 may be a non-transitory computer-readable storage medium, which may include executable instructions, and a processor, such as the processor 235 may execute the instruction to perform one or more, or portions of one or more, of the operations described herein. The electronic storage unit 240 may include storage memory for storing content, such as metadata, images, audio, or a combination thereof, captured by the computing device 200.

The electronic storage unit 240 may include non-transitory memory for storing configuration information and/or processing code for video information and metadata capture, and/or to produce a multimedia stream that may include video information and metadata in accordance with the present disclosure. The configuration information may include capture type, such as video or still image, image resolution, frame rate, burst setting, white balance, recording configuration, such as loop mode, audio track configuration, and/or other parameters that may be associated with audio, video, and/or metadata capture. The electronic storage unit 240 may include memory that may be used by other hardware/firmware/software elements of the computing device 200.

The image sensor 245 may include one or more of a charge-coupled device sensor, an active pixel sensor, a complementary metal-oxide semiconductor sensor, an N-type metal-oxide-semiconductor sensor, and/or another image sensor or combination of image sensors. The image sensor 245 may be controlled based on control signals from a sensor controller 230.

The image sensor 245 may sense or sample light waves gathered by the optics unit 255 and may produce image data or signals. The image sensor 245 may generate an output signal conveying visual information regarding the objects or other content corresponding to the light waves received by the optics unit 255. The visual information may include one or more of an image, a video, and/or other visual information.

The image sensor 245 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

The metadata unit 250 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. The computing device 200 may contain one or more other sources of metadata information, telemetry, or both, such as image sensor parameters, battery monitor, storage parameters, and/or other information related to camera operation and/or capture of content. The metadata unit 250 may obtain information related to the environment of the computing device 200 and aspects in which the content is captured.

For example, the metadata unit 250 may include an accelerometer that may provide device motion information including velocity and/or acceleration vectors representative of motion of the computing device 200. In another example, the metadata unit 250 may include a gyroscope that may provide orientation information describing the orientation of the computing device 200. In another example, the metadata unit 250 may include a global positioning system sensor that may provide global positioning system coordinates, time, and information identifying a location of the computing device 200. In another example, the metadata unit 250 may include an altimeter that may obtain information indicating an altitude of the computing device 200.

The metadata unit 250, or one or more portions thereof, may be rigidly coupled to the computing device 200 such that motion, changes in orientation, or changes in the location of the computing device 200 may be accurately detected by the metadata unit 250. Although shown as a single unit, the metadata unit 250, or one or more portions thereof, may be implemented as multiple distinct units. For example, the metadata unit 250 may include a temperature sensor as a first physical unit and a global positioning system unit as a second physical unit. In some implementations, the metadata unit 250, or one or more portions thereof, may be included in a computing device 200 as shown, or may be included in a physically separate unit operatively coupled to, such as in communication with, the computing device 200.

The optics unit 255 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 255 may include a focus controller unit that may control the operation and configuration of the camera lens. The optics unit 255 may receive light from an object and may focus received light onto an image sensor 245. Although not shown separately in FIG. 2, in some implementations, the optics unit 255 and the image sensor 245 may be combined, such as in a combined physical unit, such as a housing.

The communication unit 260 may be coupled to the I/O unit 220 and may include a component, such as a dongle, having an infrared sensor, a radio frequency transceiver and antenna, an ultrasonic transducer, and/or other communications interfaces used to send and receive wireless communication signals. The communication unit 260 may include a local, such as Bluetooth or Wi-Fi, and/or broad range, such as cellular LTE, communications interface for communication between the computing device 200 and a remote device, such as the user interface device 180 in FIG. 1. The communication unit 260 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 260 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 260 may be represented using formats including one or more of hypertext markup language (HTML), extensible markup language (XML), and/or other formats. One or more exchanges of information between the computing device 200 and remote or external devices may be encrypted using encryption technologies including one or more of secure sockets layer (SSL), transport layer security (TLS), virtual private networks (VPNs), Internet Protocol security (IPsec), and/or other encryption technologies.

The power supply 265 may supply power to the computing device 200. For example, for a small-sized, lower-power action camera a wireless power solution, such as battery, solar cell, inductive, such as contactless, power source, rectification, and/or other power supply, may be used.

Consistent with the present disclosure, the components of the computing device 200 may be remote from one another and/or aggregated. For example, one or more sensor components may be distal from the computing device 200, such as shown and described with respect to FIG. 1. Multiple mechanical, sensory, or electrical units may be controlled by a learning apparatus via network/radio connectivity.

In some implementations, one or more of the units of the computing device 200 shown in FIG. 2 may be combined or omitted. For example, the audio component 210, the user interface unit 215, the sensor controller 230, the image sensor 245, the metadata unit 250, the optics unit 255, the communication unit 260, or a combination thereof, may be omitted.

Figure 3:
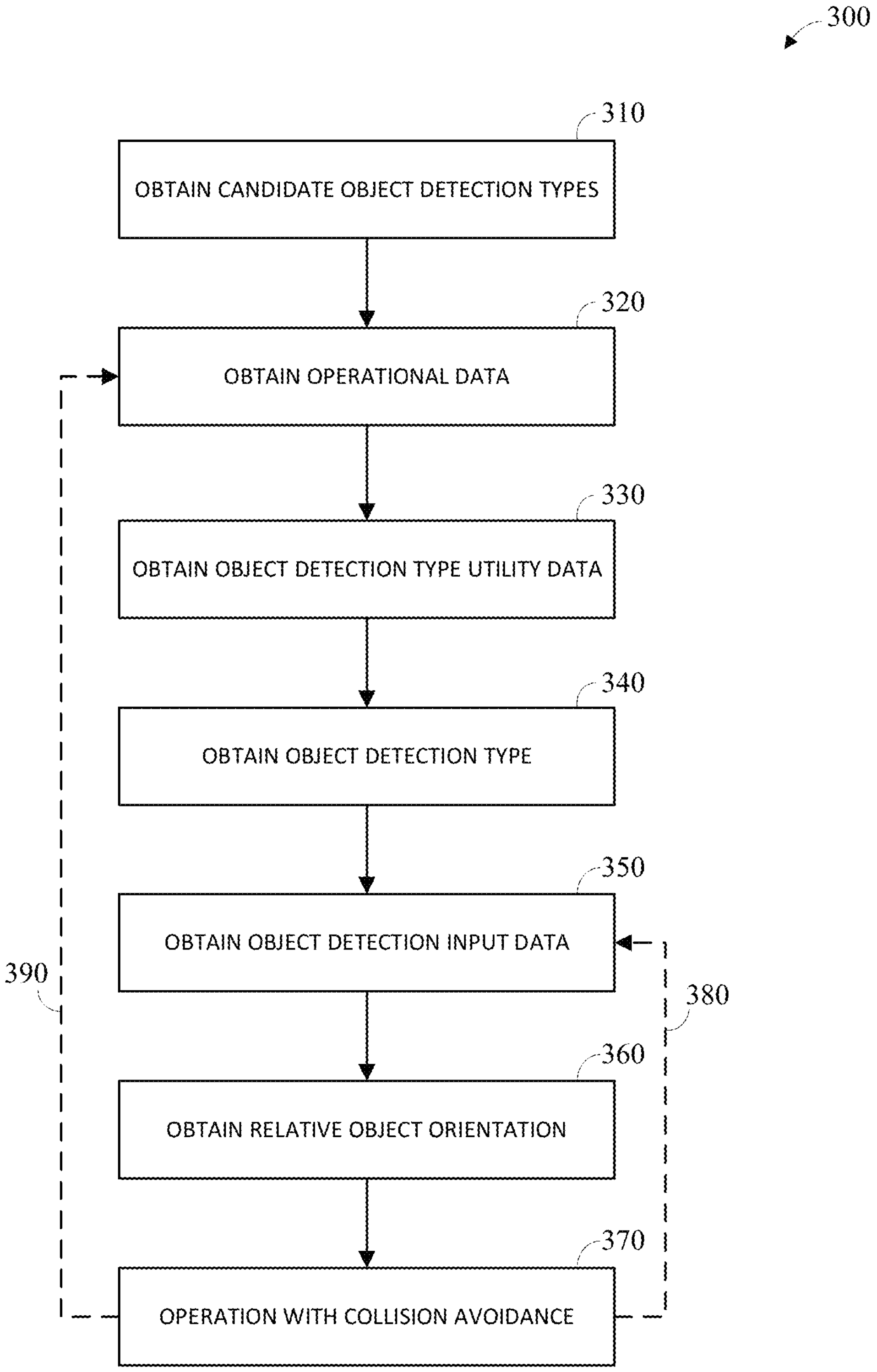
FIG. 3 is a diagram of an example of unmanned aerial vehicle collision avoidance in accordance with implementations of this disclosure.

FIG. 3 is a diagram of an example of unmanned aerial vehicle collision avoidance in accordance with implementations of this disclosure. Unmanned aerial vehicle collision avoidance 300 may be implemented in an unmanned aerial vehicle, such as the unmanned aerial vehicle 100 shown in FIG. 1, which may include an image capture apparatus, such as the sensor 170 shown in FIG. 1.

As shown, unmanned aerial vehicle collision avoidance 300 includes obtaining candidate object detection types at 310, obtaining operational data at 320, obtaining object detection type utility data at 330, obtaining an object detection type at 340, obtaining object detection input data at 350, obtaining relative object orientation data at 360, and operation with collision avoidance at 370. As indicated by the broken directional line at 380, obtaining object detection input data at 350, obtaining relative object orientation data at 360, and operation with collision avoidance at 370 may be performed any number of times, such as in accordance with a defined rate or frequency. As indicated by the broken directional line at 390, obtaining candidate object detection types at 310, obtaining operational data at 320, obtaining object detection type utility data at 330, obtaining an object detection type at 340, obtaining object detection input data at 350, obtaining relative object orientation data at 360, and operation with collision avoidance at 370 may be performed any number of times, such as in accordance with a defined rate or frequency.

Candidate object detection types may be obtained at 310. An unmanned aerial vehicle may determine an object detection type, or a combination of object detection types, from candidate object detection types. Candidate object detection types can include ultrasonic object detection, radar object detection, Time of Flight object detection, optical object detection, such as binocular object detection or monocular object detection, or the like. Ultrasonic object detection may be based on ultrasonic detectors, which may have a limited field of view and may utilize a narrow ultrasonic frequency range. Time of Flight object detection may be based on measuring a temporal duration of a light signal between the sensor (camera) and the object for one or more physical locations or points on the object. Radar object detection may include transmitting a signal, such as radio waves, toward the object, receiving reflected signals, to determine the range, angle, or velocity of objects. Ultrasonic object detection may be performed independent of illumination lighting conditions. Optical candidate object detection types, such as binocular object detection and monocular object detection, may be based on detecting light, such as visible light, and may be limited based on illumination lighting conditions. An object detection type may be identified as a primary object detection type. Candidate object detection types other than the primary object detection type may be identified as secondary object detection types.

Operational data may be obtained at 320. For example, the operational data may include illumination data, such as lighting condition data indicating an illumination level below a defined minimum illumination threshold, or indicating an illumination level above a defined maximum illumination threshold, such as a saturation level. Other operational data may be obtained, such as a velocity of the unmanned aerial vehicle, a heading, trajectory, or path of the unmanned aerial vehicle, operational data indicating an operational status of one or more component of the unmanned aerial vehicle, such as an operational status of a sensor of the unmanned aerial vehicle, or any other data that may affect the operation of the unmanned aerial vehicle and may be detected, determined, or obtained by the unmanned aerial vehicle.

Object detection type utility data may be obtained at 330. For example, obtaining the object detection type utility data may include obtaining a respective weight or score correlating each respective candidate object detection type, or sensors corresponding to the candidate object detection type, to the operational data identified at 330. In some implementations, obtaining the object detection type utility data may include obtaining the weight or score data, such as by obtaining the weight or score data from a data storage structure or memory of the unmanned aerial vehicle. For example, the operational data identified at 320 may indicate that the unmanned aerial vehicle is moving rapidly in low illumination lighting conditions and the object detection type utility data may indicate a weight or score for one or more of the candidate object detection types based on the velocity of the unmanned aerial vehicle and the illumination level.

An object detection type may be obtained at 340. For example, obtaining the object detection type may include identifying a primary object detection type from the candidate object detection types obtained at 310, determining whether the object detection type utility data, such as a utility value indicated in the object detection type utility data, for the primary object detection type exceeds a minimum utility threshold, using the primary object detection type as the object detection type in response to a determination that the object detection type utility data for the primary object detection type is at least, such as equal to or greater than, the minimum utility threshold (high utility value), and, in response to a determination that the object detection type utility data for the primary object detection type is within, such as less than, the minimum utility threshold (low utility value), obtaining a secondary object detection type as the object detection type.

For example, the unmanned aerial vehicle may be moving rapidly in optimal lighting conditions, monocular object detection may be identified as the primary object detection type, the object detection type utility data may indicate a weight or score for monocular object detection based on the velocity of the unmanned aerial vehicle and the illumination level that exceeds the minimum utility threshold, and monocular object detection may be identified as the object detection type. The illumination conditions may change to dark or low illumination, the object detection type utility data may indicate a weight or score for monocular object detection based on the velocity of the unmanned aerial vehicle and the illumination level that is below the minimum utility threshold, and a secondary object detection type, such as radar object detection, time of flight object detection, or ultrasonic object detection may be identified as the secondary object detection type and may be used as the object detection type.

Although shown separately in FIG. 3, obtaining the object detection type may include obtaining the candidate object detection types at 310, obtaining the operational data at 320, and obtaining the object detection type utility data at 330.

Obtaining object detection input data at 350 may include a sensor of the unmanned aerial vehicle obtaining, such as capturing or detecting, data. For example, the unmanned aerial vehicle may include an image capture device for obtaining optical, such as image or video, data, such as by capturing an image of a scene. The sensor may be oriented such that a field of view of the sensor includes a direction of travel of the unmanned aerial vehicle. The object detection input data may capture a representation, or content, of objects included in the scene within the field of view of the sensor.

Obtaining relative object orientation data at 360 may include identifying objects (relevant objects) along, or proximate to, an expected path of the unmanned aerial vehicle, which may include determining an expected path for a respective object and determining whether the expected path for the object intersects, or approaches within a defined distance, the expected path of the unmanned aerial vehicle.

Figure 4:
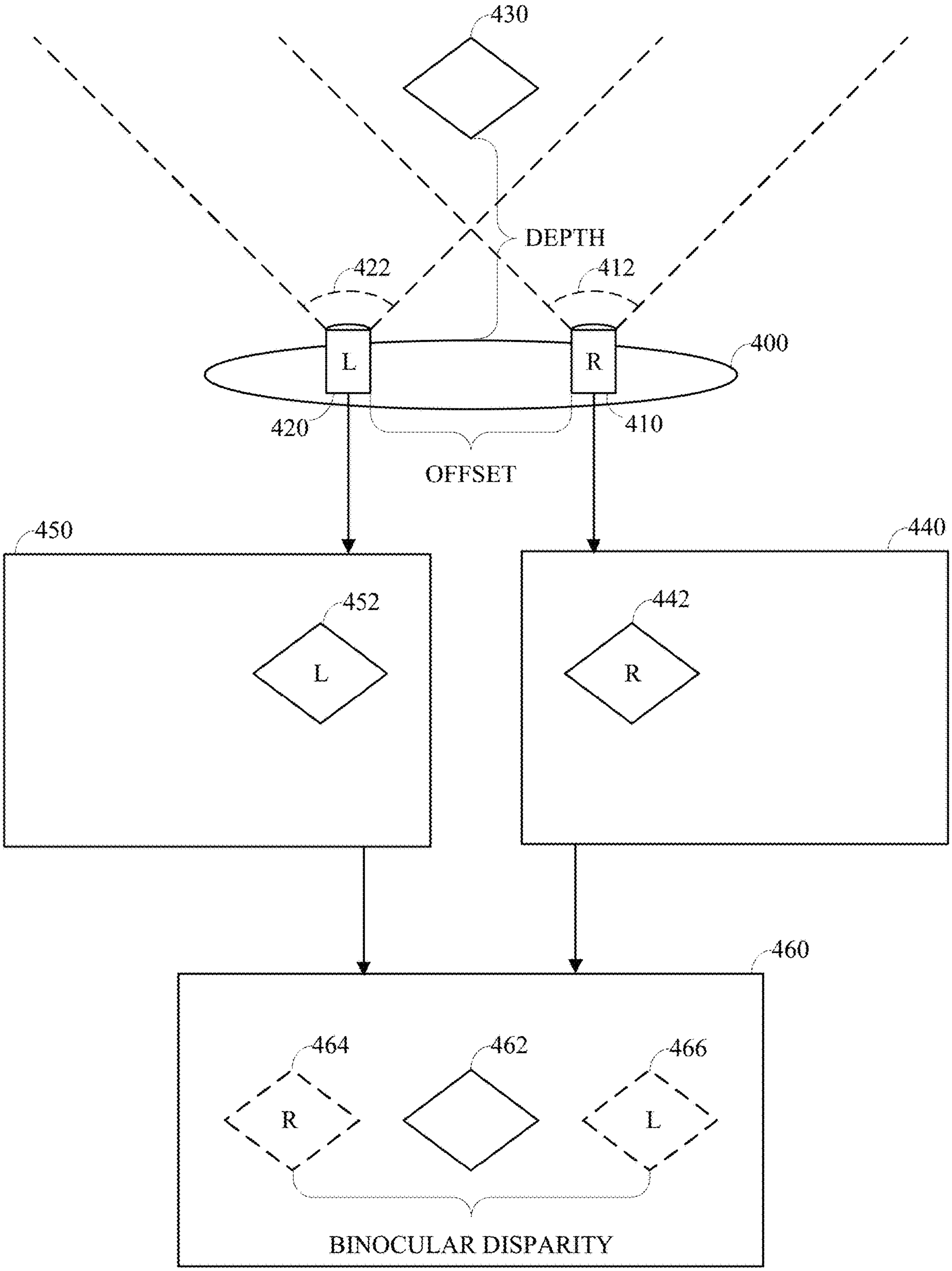
FIG. 4 is a diagram of an example of binocular object detection in accordance with implementations of this disclosure.

Obtaining the relative object orientation data at 360 may include determining a spatial location for each relevant object, such as by triangulating the respective relevant object. Optical object detection, such as binocular object detection or monocular object detection may include identifying objects based on feature, or content, recognition using the captured images. An example of obtaining relative object orientation data including binocular object detection is shown in FIG. 4. An example of obtaining relative object orientation data including monocular temporal object detection is shown in FIGS. 5-8. In some embodiments, the unmanned aerial vehicle may determine whether to use binocular object detection, monocular temporal object detection, or another type of object detection based on the operational environment of the unmanned aerial vehicle.

Operation with collision avoidance at 370 may include determining that the spatial location, or an expected spatial location, of a relevant object is convergent with a spatial location, or an expected spatial location, of the unmanned aerial vehicle, and operating the unmanned aerial vehicle to avoid a collision with the object.

In some embodiments, operation with collision avoidance at 370 may include autonomous, or semi-autonomous, operation. For example, in response to a determination that a utility value for a primary object detection type is below a minimum utility threshold, the unmanned aerial vehicle may identify an autonomous, or semi-autonomous, operation or operational mode, such as a return-to-home operation, which may include autonomously, or semi-autonomously, operating the unmanned aerial vehicle based on a secondary object detection type.

In another example, operational parameters, such as a maximum velocity, a maximum acceleration rate, a maximum altitude, a minimum obstacle safety distance, or the like, for an operational mode may be obtained dynamically based on the object detection type utility data.

FIG. 4 is a diagram of an example of binocular object detection in accordance with implementations of this disclosure. Binocular object detection, or spatial optical three-dimensional object, detection may be implemented in an apparatus 400, such as the unmanned aerial vehicle 100 shown in FIG. 1 or the computing device 200 shown in FIG. 2.

As shown, the apparatus 400 includes image capture devices 410, 420. The image capture devices 410, 420 may be spatially offset by a defined offset distance, such as by five centimeters. Other offset distances may be used. For simplicity and clarity, the image capture device 410 shown on the right is labeled "R" and may be referred to as the right image capture device 410 and the image capture device 420 shown on the left is labeled "L" and may be referred to as the left image capture device 420. Other configurations, including configurations comprising a different number, or cardinality, of image capture devices, may be used.

The right image capture device 410 has a field of view 412. The left image capture device 420 has a field of view 422. For simplicity and clarity, the field of view 412 of the right image capture device 410 may be referred to as the right field of view 412 and the field of view 422 of the left image capture device 420 may be referred to as the left field of view 422. The right field of view 412 may overlap with the left field of view 422.

FIG. 4 shows an object 430 within the right field of view 412. The object 430 is shown within the left field of view 422. The object 430 may be a spatial distance, or depth, from the apparatus 400.

The right image capture device 410 may capture an image 440, or images, of a scene including content, such as the object 430. The left image capture device 420 may capture an image 450, or images, of the scene including content, such as the object 430. For simplicity and clarity, the image 440 captured by the right image capture device 410 may be referred to as the right image 440 and the image 450 captured by the left image capture device 420 may be referred to as the left image 450.

The right image 440 includes content 442 representing the object 430. The content 442 is near the left edge of the right image 440 corresponding to the relative position of the object 430 in the right field of view 412. For simplicity and clarity, the content 442 representing the object 430 in the right image 440 is labeled "R".

The left image 450 includes content 452 representing the object 430. The content 452 is near the right edge of the left image 450 corresponding to the relative position of the object 430 in the left field of view 422. For simplicity and clarity, the content 452 representing the object 430 in the left image 450 is labeled "L".

A combined image 460, combining the right image 440 and the left image 450, is shown at the bottom of FIG. 4. The combined image 460 includes a combined representation 462 of the object 430. The relative position 464 in the combined image 460 of the content 442 as captured by the right image 440 is indicated using broken lines. The relative position 466 in the combined image 460 of the content 452 as captured by the left image 450 is indicated using broken lines. The spatial distance, or binocular disparity, between the relative position 464 in the combined image 460 of the content 442 as captured by the right image 440 and the relative position 466 in the combined image 460 of the content 452 as captured by the left image 450 may correspond with the depth of the object 430 from the apparatus 400. For example, the depth may be determined based on the binocular disparity and the offset between the image capture devices 410, 420.

The accuracy and efficiency of binocular object detection may be limited based on image resolution, the offset between the image capture devices 410, 420 relative to object depth, the velocity of the unmanned aerial vehicle relative to the respective object, or the like. Image resolution may be limited based on one or more cost metrics associated with the image capture devices 410, 420, such as unit cost, weight cost, size cost, power utilization, and the like. The accuracy and efficiency of binocular object detection be inversely proportional to the depth, the relative velocity, or both. For example, the accuracy and efficiency of binocular object detection be relatively high for an object that is relatively near the unmanned aerial vehicle and moving at a relatively low velocity relative to the unmanned aerial vehicle, such as below a velocity threshold, and the accuracy and efficiency of binocular object detection be relatively low for an object that is relatively far from the unmanned aerial vehicle and moving at a relatively high velocity relative to the unmanned aerial vehicle, such as at or above the velocity threshold.

Figure 5:
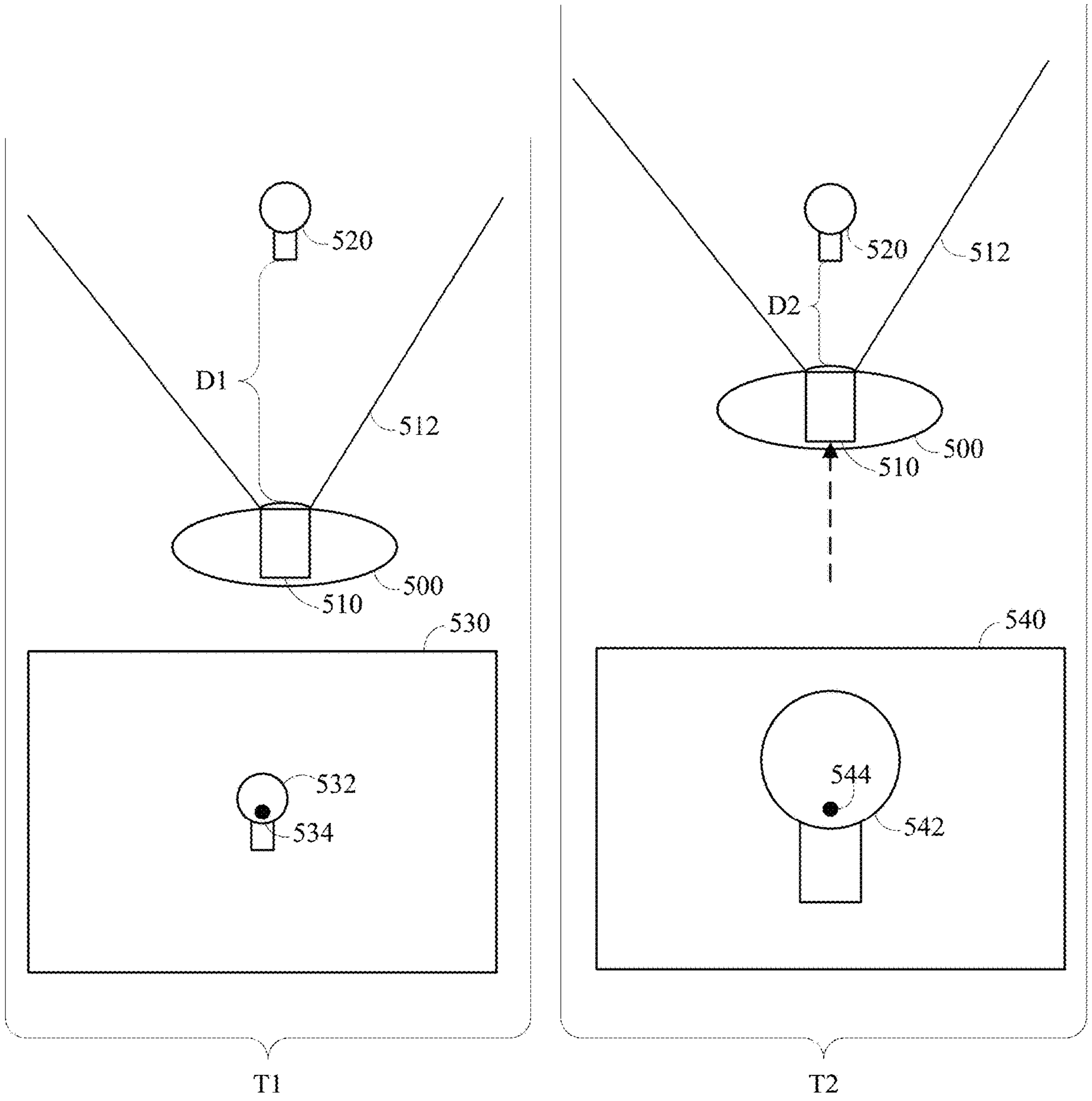
FIG. 5 is a diagram of an example of temporal optical object detection in accordance with implementations of this disclosure.

FIG. 5 is a diagram of an example of temporal optical object detection in accordance with implementations of this disclosure. Temporal optical object detection may be implemented in an apparatus 500, such as the unmanned aerial vehicle 100 shown in FIG. 1 or the computing device 200 shown in FIG. 2.

FIG. 5 includes a representation of a first temporal location (T1) including the apparatus 500 and a representation of a subsequent second temporal location (T2), wherein T1<T2, including the apparatus 500.

As shown, the apparatus 500 includes an image capture device 510. Other configurations, including configurations comprising a different number, or cardinality, of image capture devices, may be used. The image capture device 510 has a field of view 512 that includes an object 520.

In representation of the first temporal location (T1) the object 520 is shown at a first spatial distance, or depth, (D1) from the apparatus 500. In representation of the second temporal location (T2) the object 520 is shown at a second spatial distance, or depth, (D2) from the apparatus 500, wherein D1>D2. Motion of the apparatus 500 relative to the object 520 between the first temporal location (T1) and the second temporal location (T2) is indicated by a broken directional line, corresponding to the spatial difference between the first depth (D1) and the second depth (D2).

Corresponding to the first temporal location (T1), the image capture device 510 may capture a first image 530 of a scene including content, such as the object 520, which may be associated with the first temporal location (T1). Corresponding to the second temporal location (T2), the image capture device 510 may capture a second image 540 of the scene including content, such as the object 520, which may be associated with the second temporal location (T2).

The first image 530 of the scene corresponding to the first temporal location (T1) includes content 532 representing the object 520. The content 532 is relatively small corresponding to the relatively deep depth (D1). The content 532 is oriented near the optical center 534 of the first image 530. The second image 540 of the scene corresponding to the second temporal location (T2) includes content 542 representing the object 520. The content 542 is relatively large corresponding to the relatively shallow depth (D2). The orientation of the content 542 relative to the optical center 544 of the second image 540 corresponds with the orientation of the content 532 to the optical center 534 of the first image 530.

Figure 6:
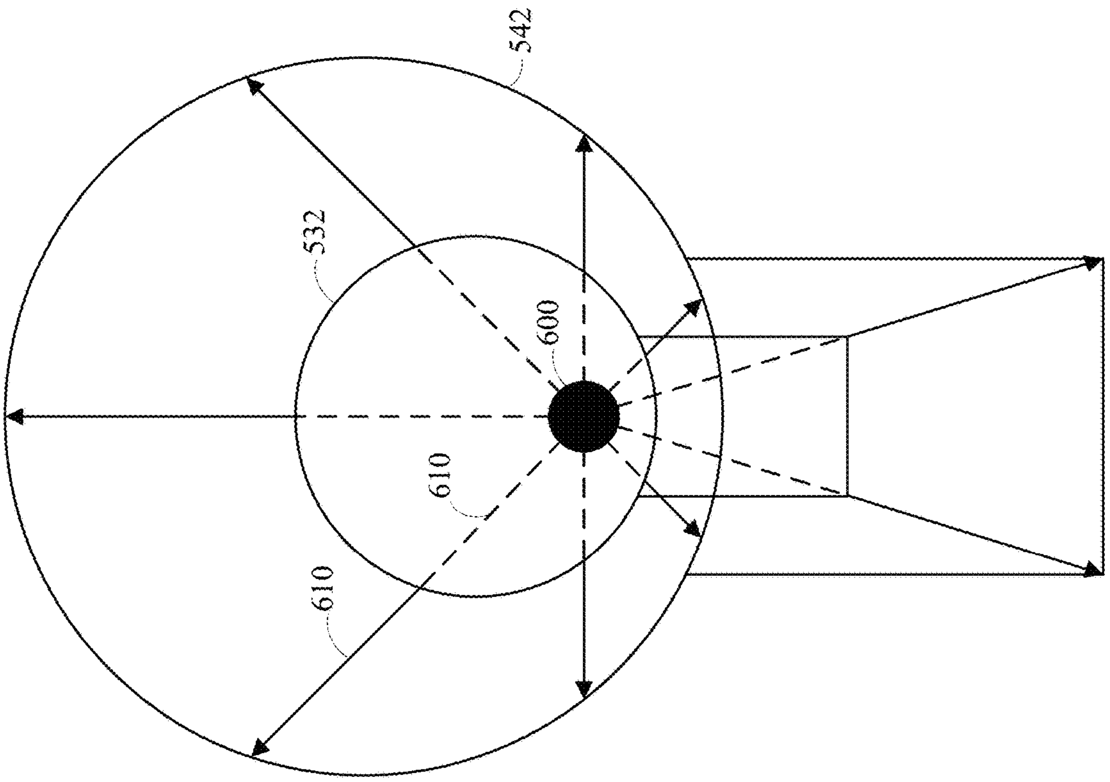
FIG. 6 is a temporal optical flow diagram of content captured in images in accordance with this disclosure.

FIG. 6 is a temporal optical flow diagram of the content 532, 542 captured in the images 530, 540 shown in FIG. 5 in accordance with this disclosure. In FIG. 6, the content 542 captured in the second image 540 corresponding to the second temporal location (T2) at the second depth (D2) is shown superimposed over the content 532 captured in the first image 530 corresponding to the first temporal location (T1) at the first depth (D1) aligned based on alignment of the respective images.

For simplicity and clarity, the relative motion of the image capture apparatus between capturing the first image and capturing the second image is oriented along the optical center as represented by the epipole 600, which corresponds with the point of convergence between the first image and the second image.

Epipolar lines 610 are shown extending from the epipole 600 to the respective edges of the content 542. A broken line portion of each epipolar line 610 represents a respective distance from the epipole 600 to the respective edge of the content 532 along the respective Epipolar line 610. A solid line portion of each epipolar line 610 represents a respective distance from the respective edge of the content 532 to the corresponding edge of the content 542 along the respective Epipolar line 610.

The orientation, including depth, of the content 532, 542 relative to the location of the image capture apparatus may be determined based on the optical flow data represented by the epipolar lines 610. Determining depth (depth reconstruction) based on optical flow data may include determining optical flow data and feature (content) correspondence in two dimensions. For example, identifying the optical flow data may include searching the second image in two dimensions for each identified object in the first image.

Figure 7:
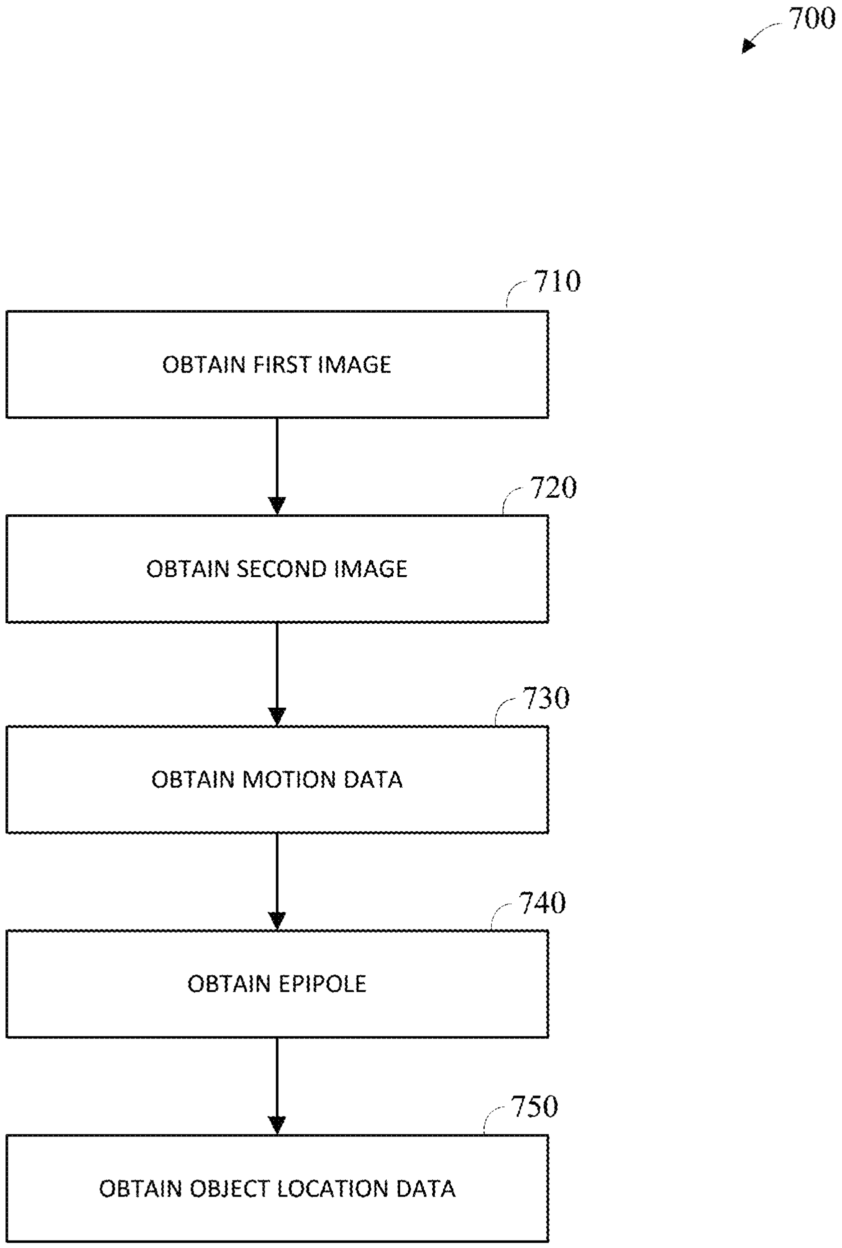
FIG. 7 is a process flow diagram of an example of temporal optical object detection in accordance with implementations of this disclosure.

FIG. 7 is a process flow diagram of an example of temporal optical object detection 700 in accordance with implementations of this disclosure. Temporal optical object detection 700 may be implemented in an unmanned aerial vehicle, such as the unmanned aerial vehicle 100 shown in FIG. 1, which may include an image capture device, such as the sensor 170 shown in FIG. 1.

As shown, temporal optical object detection 700 includes obtaining a first image at 710, obtaining a second image at 720, obtaining motion data at 730, obtaining an epipole at 740, and obtaining object location data at 750. For example, obtaining object detection input data as shown at 350 in FIG. 3 may be similar to, or include, obtaining the first image at 710 and obtaining the second image at 720, and obtaining relative object orientation data as shown at 360 in FIG. 3 may be similar to, or include, obtaining motion data at 730, obtaining an epipole at 740, and obtaining object location data at 750.

The first image may be obtained at 710. For example, an image capture device of the unmanned aerial vehicle may capture the first image at a first temporal location and a first spatial location. For example, the first image obtained at 710 may be similar to the first image 530 shown in FIG. 5. For example, the field of view of the image capture device of the unmanned aerial vehicle corresponding to capturing the first image at 710 may be similar to the field of view 512 shown for the first temporal location (T1) in FIG. 5, the field of view of the image capture device of the unmanned aerial vehicle may include the object, which may be similar to the object 520 shown for the first temporal location (T1) in FIG. 5, the first image obtained at 710 may be similar to the first image 530 shown in FIG. 5, and the first image obtained at 710 may include content, which may be similar to the content 532 shown in FIG. 5.

A second image may be obtained at 720. For example, the image capture device of the unmanned aerial vehicle may capture the second image at a second temporal location, which may be subsequent to the first temporal location, and a second spatial location. Although not shown separately in FIG. 7, the UAV may change spatial location between capturing the first image at 710 and capturing the second image at 720. For example, the field of view of the image capture device of the unmanned aerial vehicle corresponding to capturing the second image at 720 may be similar to the field of view 512 shown for the second temporal location (T2) in FIG. 5, the field of view of the image capture device of the unmanned aerial vehicle may include the object, which may be similar to the object 520 shown for the second temporal location (T2) in FIG. 5, the second image obtained at 720 may be similar to the second image 540 shown in FIG. 5, and the second image obtained at 720 may include content, which may be similar to the content 542 shown in FIG. 5.

Motion data may be obtained at 730. The motion data may indicate a difference or change of spatial location for the unmanned aerial vehicle. For example, the motion data may be obtained based on GPS data, inertial data, or a combination thereof. The motion data may indicate the difference in spatial location of the image capture apparatus between capturing the first image at 710 and capturing the second image at 720.

An epipole may be obtained at 740. The epipole may correspond with a point of convergence between the first image obtained at 710 and the second image obtained at 720. The epipole may be obtained based on the motion data obtained at 730. For example, the motion data obtained at 730 may indicate a spatial trajectory, such as a direction and distance of travel, for the unmanned aerial vehicle, may include orientation information for the first image captured at 710 relative to the spatial trajectory of the unmanned aerial vehicle, and may include orientation information for the second image captured at 720 relative to the spatial trajectory of the unmanned aerial vehicle, and obtaining the epipole at 740 may include correlating the spatial trajectory of the unmanned aerial vehicle to the first image, the second image, or both, such as by identifying a point, such a pixel, in each respective image corresponding to the spatial trajectory as the respective epipole. The epipole may be identified using epipolar geometry based on camera data, which may include linear velocity data, angular velocity data, or both.

Object location data may be obtained at 750. Obtaining the object location data at 750 may include identifying one or more objects represented as content in the first image obtained at 710 (first object data). Obtaining the object location data at 750 may include evaluating the optical flow from the first image to the second image along epipolar lines in the second image captured at 720 to obtain second object data. Obtaining object location data at 750 may include obtaining object location data on a pixel-by-pixel basis, a patch-by-patch basis, or a combination thereof.

Obtaining the first object data may include image analysis, such as feature recognition or object detection, based on the first image obtained at 710. Obtaining the first object data may include obtaining object data indicating a portion of the first image that represents an object in the field of view of the image capture device of the unmanned aerial vehicle. Although described with respect to one object, multiple objects may be identified.

Figure 8:
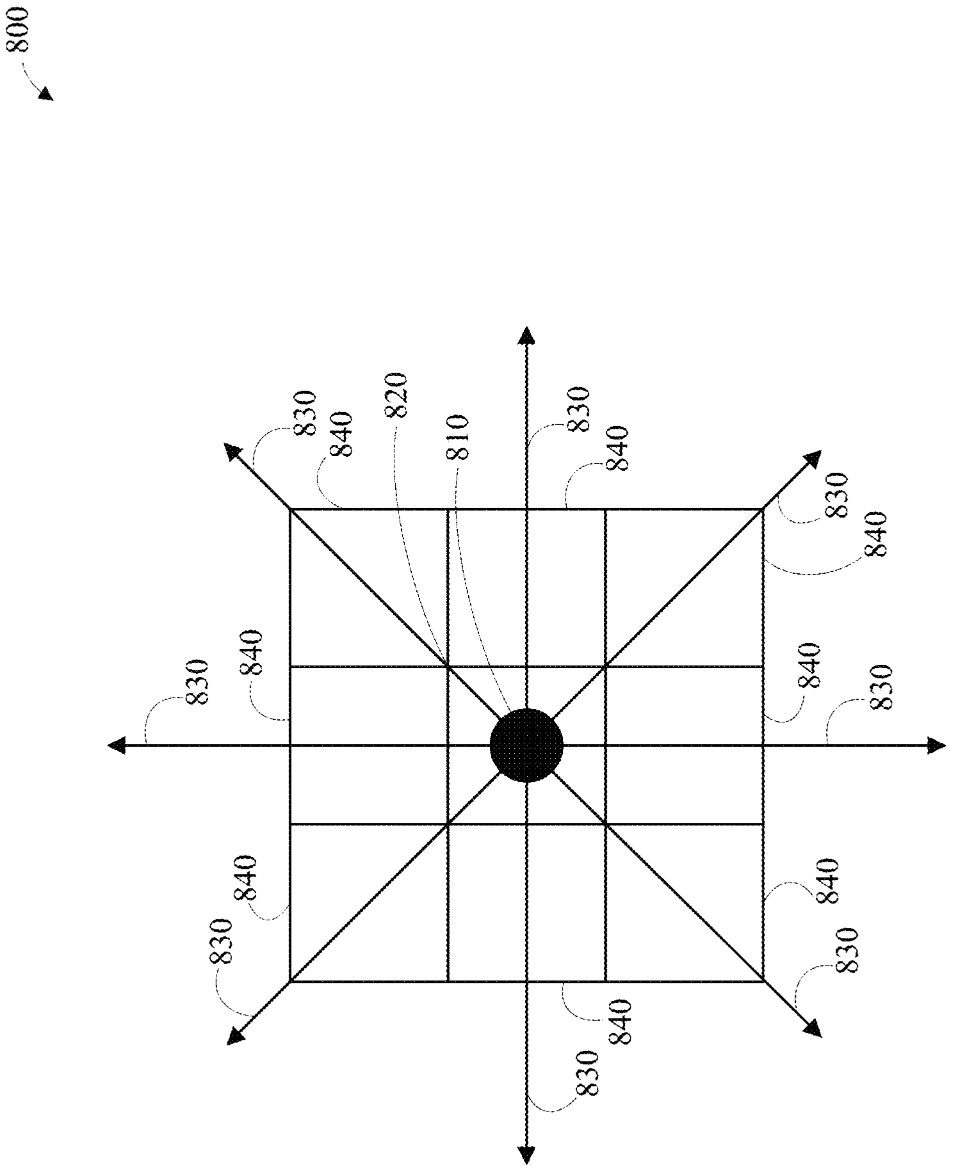
FIG. 8 is a diagram of an example of a portion of a frame for temporal optical object detection in accordance with this disclosure.

Obtaining the object location data at 750 may include obtaining epipolar lines extending from the epipole in the first image, the second image, or both. An example of obtaining epipolar lines is shown in FIG. 8. Obtaining the epipolar lines may include obtaining a defined number, count, or cardinality, of epipolar lines, such as eight epipolar lines. For example, the epipole may correspond with a pixel in the respective frame and obtaining the epipolar lines may include identifying a line or path extending from the epipole pixel, such that each respective epipolar line intersects a neighboring pixel in the respective image.

Evaluating the optical flow along the epipolar lines in the second image captured at 720 may include one-dimensionally searching the second image along the epipolar lines to identify content corresponding to the content identified in the first image, and determining a spatial difference between the portion of the first image representing the object and the corresponding portion of the second image representing the object. Two-dimensional optical flow analysis may be omitted.

Obtaining the object location data at 750 may include triangulating one or more of the identified objects. Triangulation may include obtaining an object depth, indicating a spatial distance between the object and the unmanned aerial vehicle, for the respective object based on the optical flow, which may indicate optical flow differences. The optical flow data may indicate motion, such as based on differences in location within respective frames, of pixels, groups of pixels or patches, or a combination thereof between the first image and the second image.

Triangulation may be omitted for one or more of the objects identified in the first image. For example, object information from the second image corresponding to an object identified in the first image may be unavailable, which may indicate that the object is outside the path of the unmanned aerial vehicle, or the object may be otherwise identified as outside the path of the unmanned aerial vehicle, and triangulation for the object may be omitted.

Although not expressly shown in FIG. 7, obtaining the object location data at 750 may include identifying one or more objects in the second image other than the objects identified in the first image, and of temporal optical object detection 700 may be performed using the second image as the first image and using a third image, captured temporally subsequently to the second image, as the second image.

Temporal optical object detection 700 may be performed using images captured by one image capture device of the unmanned aerial vehicle and may omit using images captured by a second image capture device of the unmanned aerial vehicle. Temporal optical object detection 700 may utilize fewer resources, such as processor resources, than two-dimensional optical flow analysis or higher resolution binocular object detection, which may reduce spatial utilization, reduce weight, reduce heat generation, such that cooling resource utilization is reduced, or a combination thereof.

Temporal optical object detection 700 may improve the accuracy of object detection relative to binocular object detection for relatively distant objects, such as objects having a depth that exceeds a defined threshold, in accordance with relatively significant motion of the unmanned aerial vehicle, such as motion that includes a velocity that exceeds a defined threshold, or for a combination of relatively distant objects and relatively significant motion.

FIG. 8 is a diagram of an example of a portion of a frame 800 for temporal optical object detection as shown in FIG. 7 in accordance with this disclosure. The portion of the frame 800 shown in FIG. 8 includes an epipole 810, represented as a solid black circle, spatially aligned with a pixel location 820, represented a square. Epipolar lines 830 may be obtained or identified as shown, extending from the epipole 810 such that each epipolar line 830 intersects with a respective neighboring pixel location 840.

Where certain elements of these implementations may be partially or fully implemented using known components, only those portions of such known components that are necessary for an understanding of this disclosure have been described. Detailed descriptions of other portions of such known components have been omitted so as not to obscure the disclosure. The drawings are for the purpose of illustration and description only and are not intended as a definition of the limits of the disclosure.

As used in the specification and in the claims, the singular form of "a," "an," and "the" include plural referents unless the context clearly dictates otherwise.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An aerial vehicle comprising:

one or more image capture devices configured to capture a first image of an object and a second image of the object; and a computing device comprising:

a processor configured to:

obtain a first utility of a first candidate object detection type based on operational data for the aerial vehicle, wherein the first candidate object detection type is configured to obtain location data for the object;

obtain an object detection type from the first candidate object detection type and a second candidate object detection type based on the first utility of the first candidate object detection type, wherein the second candidate object detection type is configured to obtain the location data for the object by evaluating the first image and the second image; and obtain the location data for the object based on the object detection type; and a trajectory controller configured to change a spatial trajectory of the aerial vehicle based on the location data for the object.

2. The aerial vehicle of claim 1, wherein the processor is further configured to:

obtain the first candidate object detection type as the object detection type based on the first utility of the first candidate object detection type exceeding a utility threshold.

3. The aerial vehicle of claim 2, wherein the processor is further configured to:

obtain a second utility of the second candidate object detection type based on the operational data for the aerial vehicle; and obtain the second candidate object detection type as the object detection type based on the second utility of the second candidate object detection type exceeding the utility threshold.

4. The aerial vehicle of claim 1, wherein the operational data for the aerial vehicle includes a velocity of the aerial vehicle.

5. The aerial vehicle of claim 2, wherein the operational data for the aerial vehicle includes an illumination level of the object.

6. The aerial vehicle of claim 1, further comprising:

a sensor configured to obtain location information of the object, wherein the first candidate object detection type is configured to obtain the location data for the object based on the location information of the object from the sensor.

7. The aerial vehicle of claim 6, wherein the first candidate object detection type comprises at least one of ultrasonic object detection, radar object detection, time of flight object detection, or binocular object detection.

8. A method, comprising:

capturing, by one or more image capture devices of a mobile apparatus, a first image of an object and a second image of the object;

obtaining, by a processor of the mobile apparatus, a first utility of a first candidate object detection type based on operational data for the mobile apparatus, wherein the first candidate object detection type is configured to obtain location data for the object;

obtaining, by the processor, an object detection type from the first candidate object detection type and a second candidate object detection type based on the first utility of the first candidate object detection type, wherein the second candidate object detection type is configured to obtain the location data for the object by evaluating the first image and the second image;

obtaining the location data for the object based on the object detection type; and changing a spatial trajectory of the mobile apparatus based on the location data for the object.

9. The method of claim 8, further comprising:

obtaining the first candidate object detection type as the object detection type based on the first utility of the first candidate object detection type exceeding a utility threshold.

10. The method of claim 9, further comprising:

obtaining a second utility of the second candidate object detection type based on the operational data for the mobile apparatus; and obtaining the second candidate object detection type as the object detection type based on the second utility of the second candidate object detection type exceeding the utility threshold.

11. The method of claim 8, wherein the operational data for the mobile apparatus includes a velocity of the mobile apparatus.

12. The method of claim 9, wherein the operational data for the mobile apparatus includes an illumination level of the object.

13. The method of claim 8, further comprising:

obtaining, by a sensor, location information of the object, wherein the first candidate object detection type is configured to obtain the location data for the object based on the location information of the object from the sensor.

14. The method of claim 13, wherein the first candidate object detection type comprises at least one of ultrasonic object detection, radar object detection, time of flight object detection, or binocular object detection.

15. A non-transitory computer-readable storage medium including program instructions executable by one or more processors that, when executed, perform operations, the operations comprising:

capturing, by one or more image capture devices of a mobile apparatus, a first image of an object and a second image of the object;

obtaining, by a processor of the mobile apparatus, a first utility of a first candidate object detection type based on operational data for the mobile apparatus, wherein the first candidate object detection type is configured to obtain location data for the object;

obtaining, by the processor, an object detection type from the first candidate object detection type and a second candidate object detection type based on the first utility of the first candidate object detection type, wherein the second candidate object detection type is configured to obtain the location data for the object by evaluating the first image and the second image;

obtaining the location data for the object based on the object detection type; and changing a spatial trajectory of the mobile apparatus based on the location data for the object.

16. The non-transitory computer-readable storage medium of claim 15, the operations further comprising:

obtaining the first candidate object detection type as the object detection type based on the first utility of the first candidate object detection type exceeding a utility threshold.

17. The non-transitory computer-readable storage medium of claim 16, the operations further comprising:

obtaining a second utility of the second candidate object detection type based on the operational data of the mobile apparatus; and obtaining the second candidate object detection type as the object detection type based on the second utility of the second candidate object detection type exceeding the utility threshold.

18. The non-transitory computer-readable storage medium of claim 15, wherein the operational data for the mobile apparatus includes a velocity of the mobile apparatus.

19. The non-transitory computer-readable storage medium of claim 18, wherein the operational data for the mobile apparatus includes an illumination level of the object.

20. The non-transitory computer-readable storage medium of claim 15, the operations further comprising:

obtaining, by a sensor, location information of the object, wherein the first candidate object detection type is configured to obtain the location data for the object based on the location information of the object from the sensor.

* * * * *